US012571356B2

(12) United States Patent
Sinsheimer et al.

(10) Patent No.: US 12,571,356 B2
(45) Date of Patent: Mar. 10, 2026

(54) CAMLESS RECIPROCATING ENGINE CONTROL SYSTEM

(71) Applicant: Adaptive Camless Technology, LLC, Santa Monica, CA (US)

(72) Inventors: Peter Sinsheimer, Los Angeles, CA (US); Isak Bosman, Newport Beach, CA (US)

(73) Assignee: Adaptive Camless Technology, LLC, Santa Monica, CA (US)

( * ) Notice: Subject to any disclaimer, the term of this patent is extended or adjusted under 35 U.S.C. 154(b) by 10 days.

(21) Appl. No.: 18/936,707

(22) Filed: Nov. 4, 2024

(65) Prior Publication Data

US 2025/0059925 A1 Feb. 20, 2025

Related U.S. Application Data

(63) Continuation of application No. PCT/US2022/027868, filed on May 5, 2022.

(51) Int. Cl.

| | |
|---|---|
| ***F01L 9/20*** | (2021.01) |
| ***F01L 9/21*** | (2021.01) |
| ***F02D 35/02*** | (2006.01) |
| ***F02D 41/00*** | (2006.01) |

(52) U.S. Cl.

CPC .............. *F02D 35/022* (2013.01); *F01L 9/21* (2021.01)

(58) Field of Classification Search

CPC ........ F01L 9/20; F01L 9/21; F01L 2009/2103; F01L 2009/2105; F01L 2009/2107; F02D 35/022; F02D 41/1405; F02D 41/1451

USPC .......................................... 123/90.11, 406.28

See application file for complete search history.

(56) References Cited

U.S. PATENT DOCUMENTS

| | | | | |
|---|---|---|---|---|
| 6,966,285 | B1 | 11/2005 | Sun | |
| 2007/0272179 | A1* | 11/2007 | Luercho .................... | F01L 9/20 123/90.11 |
| 2015/0198068 | A1* | 7/2015 | Boeck ...................... | F01M 1/02 123/90.31 |
| 2019/0017487 | A1 | 1/2019 | Rudnitzki et al. | |
| 2020/0132552 | A1* | 4/2020 | Brummel .................. | G01J 5/58 |
| 2021/0003087 | A1* | 1/2021 | Spearrin ................. | F02D 15/02 |
| 2021/0348576 | A1 | 11/2021 | Sudarsan | |

FOREIGN PATENT DOCUMENTS

| | | | |
|---|---|---|---|
| WO | WO 2004/048761 | A1 | 6/2004 |
| WO | WO 2019/152886 | A2 | 8/2019 |

OTHER PUBLICATIONS

International Search Report and Written Opinion received in PCT Application No. PCT/US2022/027868, dated Jan. 31, 2023 in 13 pages.

* cited by examiner

*Primary Examiner* — Erick R Solis

(74) *Attorney, Agent, or Firm* — Knobbe, Martens, Olson & Bear, LLP

(57) ABSTRACT

Systems and methods are provided for a camless reciprocating engine control system that uses laser absorption spectroscopy (LAS) sensors and artificial intelligence/machine learning to optimize engine operation. The control system evaluates LAS data in real time or substantially real time to optimize the operation of the engine through dynamic management of camless engine components such as intake valves, exhaust valves, fuel injectors, spark plugs, and variable compression mechanisms.

20 Claims, 7 Drawing Sheets

CAMLESS RECIPROCATING ENGINE CONTROL SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to reciprocating engines, and more particularly to a real-time adaptive any-fuel engine using sensor feedback.

Description of the Related Art

Reciprocating engines use parameters for engine functions such as timing, duration and phase of various engine components. In conventional reciprocating engines with mechanical camshafts, the parameters are fixed and result in a compromise of optimal intake and exhaust timing between high and low engine loads. A feature of a camless engine is the removal of the mechanical camshaft, thereby enabling variable valve timing (VVT) by electromagnetic or hydraulic actuation of the valves which control intake and exhaust.

SUMMARY

In some aspects, the techniques described herein relate to a camless reciprocating engine including: a cylinder housing a reciprocating piston; an engine component associated with the cylinder, wherein the engine component is selected from a group consisting of: an intake valve, an exhaust valve, a spark plug, a fuel injector, and a variable compression mechanism; an actuator coupled to the engine component, wherein the actuator is configured to control operation of the engine component; an optical sensor configured to generate sensor data regarding an attribute of cylinder operation; and a controller coupled to the optical sensor and actuator, wherein the controller is configured to: receive the sensor data from the optical sensor; process the sensor data using a neural network trained to generate actuator command data associated with a desired optimization of engine operation; and initiate actuation of the actuator based at least partly on the actuator command data.

In some aspects, the techniques described herein relate to a system including: computer-readable memory storing executable instructions; and one or more computer processors in communication with the computer-readable memory and programmed by the executable instructions to at least: obtain training data including a plurality of training data input vectors and a plurality of reference data output vectors, wherein a training data input vector of the plurality of training data input vectors represents sensor data regarding an attribute of operation of a camless engine, and wherein a reference data output vector of the plurality of reference data output vectors represents actuator command data to be generated by a machine learning model from the training data input vector; train the machine learning model using the training data and an objective function, wherein the objective function is associated with optimization of an engine function; and provide the machine learning model that has been trained to one or more camless engines.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
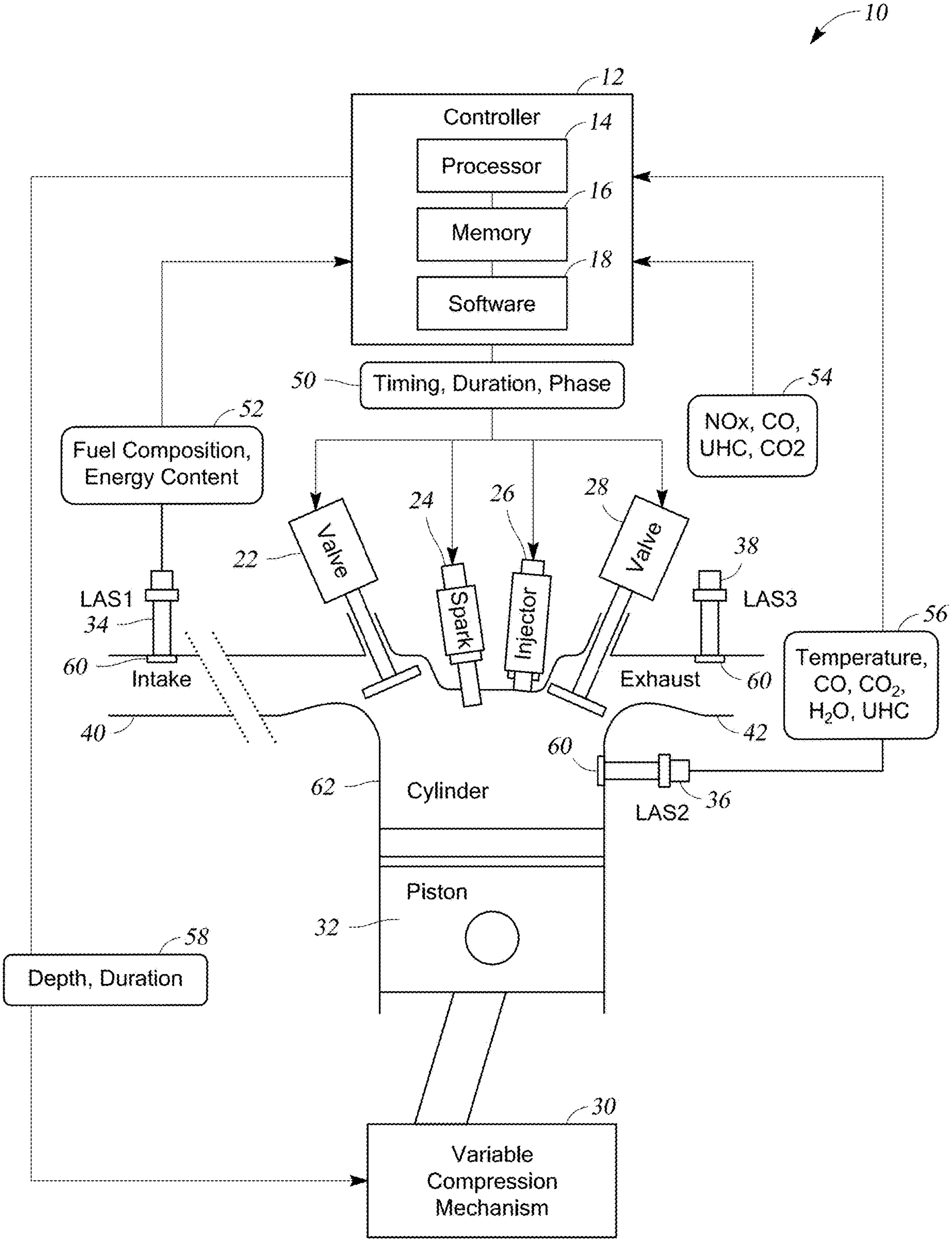
FIG. 1 is a diagram of a single-cylinder cross-section of a camless engine with sensors and a control system according to some embodiments.

The present disclosure is directed to a camless reciprocating engine control system that uses laser absorption spectroscopy (LAS) sensors and artificial intelligence/machine learning to optimize engine operation. The control system evaluates LAS sensor data in real time or substantially real time to optimize the operation of the engine through dynamic management of camless engine components such as intake valves, exhaust valves, fuel injectors, spark plugs, and variable compression mechanisms. Advantageously, the real-time or substantially real-time evaluation and optimization may in some embodiments be based on up-to-the-millisecond LAS sensor data regarding the state of the engine, and may result in changes to the operation of engine components within milliseconds or microseconds of evaluation of the LAS sensor data. Thus, the control system may implement changes in the operation of engine components within a single engine cycle, or within a single stroke of an engine cycle (e.g., within a single stroke of a two-stroke or four-stroke engine cycle).

Some conventional reciprocating engines use fixed parameters for various features and components (e.g., timing, duration, phase, etc.). The fixed parameters may be implemented using a mechanical camshaft that typically has only one lobe per valve. Thus, conventional valve actuation involves fixed duration, lift, and overall profile over the course of time and from cycle-to-cycle. Such fixed parameters may be the result of a compromise, such as a compromise of optimal intake and exhaust timing between high and low engine loads or between extremes of expected environmental conditions. In some cases, the fixed parameters may be the result of—or may be the cause of—a predetermined limitation on the engine, such as use of a particular fuel, or use over a limited lifespan during which changes in the performance of engine components is not expected to change.

Camless engines can address any or all of the above-mentioned problems, among others, through dynamic adjustment of operating parameters. More specifically, because camless engines do not rely on mechanical camshafts, camless engines can dynamically control engine components over the course of time and/or from cycle-to-cycle. For example, camless engines can implement variable valve timing (VVT) by electromagnetic or hydraulic actuation of the poppet valves which control intake and exhaust.

Camless engines may use optical sensors, such as LAS sensors, positioned in various engine locations (e.g., in-cylinder, upstream at intake, and/or downstream at exhaust of the cylinder) to measure properties of fuel, engine operation, and the like (e.g., temperature during combustion, species concentration, etc.). These sensors may rapidly produce sensor data, in some cases many times faster than an operational parameter of an engine component can be modified. For example, LAS sensors may provide sensor data (e.g., fuel composition and energy content data received from the intake, NOx, CO, UHC, $CO_2$ data received from the exhaust, or temperature, CO, $H_2O$, UHC, $CO_2$ data received from the cylinder) dozens of times per cycle. A control system that is configured to process such a volume and/or frequency of sensor data and detect patterns in the data can be used to actively manage rapid actuation of electronically controlled mechanical devices (e.g., intake valves, exhaust valves, spark plugs, fuel injectors, and variable compression mechanisms) and achieve an optimal or desired target.

Advantageously, by using artificial intelligence/machine learning (AI/ML), a camless engine control system may be configured to optimize engine operation in real time or substantially real time based on operational LAS sensor data. Moreover, the control system may be configured to provide optimization under various conditions, such as under various combinations of fuels, speeds, loads, temperatures, etc. The optimization of engine operation and other features described herein may be difficult, impractical, or impossible without the combination of the dynamic control afforded by camless engines, the real-time or substantially-real-time sensor data provided by LAS sensors, and the data-driven insights learned through application of AI/ML.

Some aspects of the present disclosure enable realization of various optimizations and features through training and use of a machine learning model to generate commands for engine component actuators. In some embodiments, LAS sensor data (e.g., fuel composition and energy content data received from the intake; temperature, NOx, CO, UHC, $CO_2$ data received from the exhaust; temperature, CO, $H_2O$, UHC, $CO_2$ data received from the cylinder; or some combination thereof) may be labeled with corresponding actuator commands to be implemented to achieve a particular optimization goal or other feature. The machine learning model may be trained to generate the actuator commands or adjustments thereto based on LAS sensor data received during engine operation. Examples of machine learning models that may be used with aspects of this disclosure include artificial neural networks (including deep neural networks, recurrent neural networks, convolutional neural networks, and the like), linear regression models, logistic regression models, decision trees, random forests, support vector machines, naïve or non-naïve Bayesian networks, k-means clustering, other models or algorithms, or any ensemble thereof.

Additional aspects of the present disclosure relate to use of reinforcement learning to train a machine learning model to generate commands for engine component actuators. In some embodiments, a reward structure may be implemented to drive the training of a machine learning model to a particular policy. For example, if the policy is to effect minimization of certain emissions, then a reward unit may be provided when sensor readings for those emissions fall below a threshold for a predetermined or dynamically determined quantity of such sensor readings. Examples of reinforcement learning methods that may be used with aspects of this disclosure include Q-learning, state-action-reward-state-action (SARSA), and temporal difference (TD).

One or more of the disclosed engine control systems can be used with a variety of engine types but are particularly suited for use with internal combustion engines. For example, and without limitation, some or all of the disclosed engine control systems can be used with 2-stroke engines, 4-stroke engines, rotary engines, and variants thereof, regardless of fuel types used with such engines. Additionally, the engine control system can be used with any internal combustion engine that includes at least one of the following: one or more valves to control intake and/or exhaust flow, one or more fuel injectors, or one or more fuel ignitors (e.g., a spark plug or a glow plug).

Various aspects of the disclosure will now be described with regard to certain examples and embodiments, which are intended to illustrate but not limit the disclosure. Although the examples and embodiments described herein will focus, for the purpose of illustration, on specific engines, engine components, calculations and algorithms, one of skill in the art will appreciate the examples are illustrative only, and are not intended to be limiting. In addition, any feature, process, device, or component of any embodiment described and/or illustrated in this specification can be used by itself, or with or instead of any other feature, process, device, or component of any other embodiment described and/or illustrated in this specification.

Example Camless Reciprocating Engine

While the control system and related features described herein are not limited to a specific camless engine, one example of a camless engine with which the control system and related features may be used described in PCT International Publication No. WO 2019/152886 published on Aug. 8, 2019, which is incorporated by reference herein and forms part of this disclosure.

FIG. 1 depicts an embodiment of the camless engine 10 as described in PCT International Publication No. WO 2019/152886. As shown, engine 10 includes a cylinder 62 that houses a reciprocating piston 32 and incorporates electronically-controllable actuators in the form of one or more valves 22 and 28, spark ignition apparatus 24 (e.g., spark plugs), and fuel injection apparatus 26 that manage functions including intake/exhaust valve timing, compression ratio, spark ignition, and fuel injection. One or more sensors are provided, such as LAS sensors 34, 36, and 38 in various engine locations. For example, intake LAS sensor 34 (also referred to as LAS1), in-cylinder LAS sensor 36 (also referred to as LAS2), and exhaust LAS sensor 38 (also referred to as LAS3) measure various attributes associated with operation of the engine 10.

Control system 12 may include a processor 14, memory 16, and software 18. The control system 12, also referred to as controller 12, may process sensor input data (e.g., fuel composition and energy content data 52 received from intake 40 and LAS1 34, temperature, NOx, CO, UHC, $CO_2$ data 54 from exhaust 42 and LAS3 38, or temperature, CO, $H_2O$, UHC, $CO_2$ data 56 from cylinder 62 and LAS2 36) to actively manage rapid actuation of engine components (e.g., intake, exhaust, spark plug, fuel injector, variable compression mechanism). As described in greater detail below, the software 18 may be configured leverage AI/ML through use of a model and/or algorithm to optimize the engine 10 in real-time for a range of engine loads and fuels or fuel blends. In some embodiments, the controller 12 or some other module or component of the engine 10 may include a network interface (not shown), such as a network interface card (NIC) with an integrated Wi-Fi antenna, Bluetooth® antenna, or cellular/mobile phone network antenna. The network interface may facilitate communication with a computing system external to the network. For example, sensor data and/or actuator command data may be transmitted to a computing system via the network interface. As another example, machine learning models or executable code may be received via the network interface, and may supplement or replace machine learning models and/or code previously provided to the controller 12.

In the embodiment illustrated in FIG. 1, one or more lasers (LAS1, LAS2, or LAS3) may be utilized to collect specific types of gas property data (e.g., temperature during combustion, species concentration, etc.) via a spectroscopic technique (e.g., absorption) and send the information to the adaptive controller 12. This information is used to modify and deliver one or more functions 50 such as timing, phase, and duration of operation for specific electronically controlled mechanical devices (e.g., intake valve 22, exhaust valve 28, spark plug 24, and fuel injector 26). Additionally, various control parameters 58 may be used to control the gear box for piston compression (e.g., via variable compression mechanism 30). Control parameters may comprise one or more temporal characteristics of these devices (e.g., timing, duration, sequencing, or depth).

Finally, the laser spectroscopy sensors LAS1, LAS2 and LAS3 may subsequently then read the impact of this modification and provide rapid feedback to the controller 12 to continuously adapt to engine output, fuel input, emissions, and engine load changes. The entire process can be done in microseconds to milliseconds.

Laser spectroscopy sensors LAS1, LAS2 and LAS3 are particularly implemented for performing measurements in harsh combustion environments and resolving the time-scales of chemistry (milliseconds to microseconds) and other flow-field dynamics. These LAS optical measurements are made in situ through small windows 60 disposed in the walls of the engine (e.g., mounted flush with the inside wall of the sensor location) so as to be non-intrusive to the combustion mechanics of the engine 10.

In some embodiments, LAS1, LAS2 and LAS3 comprise semi-conductor lasers 10 in the mid-infrared wavelength region to provide reduced cost and size to thereby enable deployable modalities. It is appreciated that the particular locations shown in FIG. 1 for sensors LAS1, LAS2 and LAS3 are for illustrative purposes only, and that any number of locations, sensors, and sensor types may be employed. Illustratively, the three general target engine locations for these optical sensors may be positioned as follows to provide information for control and actuation: 1) upstream for fuel composition; 2) in-cylinder for temperature and major species; and 3) downstream for exhaust for trace emissions sensing. Fuel composition measured upstream (e.g., with LAS1) may be used to optimize fuel-air ratios prior to combustion to prevent excessively rich or lean conditions. In-cylinder (e.g., with LAS2) temperature and species measurements can be used to optimize compression ratios and exhaust gas recirculation for preventing NOx formation. Exhaust stream measurements (e.g., with LAS3) may be used to identify major emitters such as carbon monoxide, unburned hydrocarbons, and NOx can be leveraged to fine tune other valve timing on the fly.

In some embodiments, the current state of the engine 10 may be described in terms of the current stroke for each cylinder (e.g., intake stroke, compression stroke, power stroke, exhaust stroke), the current rotations per minute (RPM) that the engine 10 is applying to the crankshaft, the torque that the engine 10 is applying to the crankshaft, and the LAS sensor data generated by each of the LAS sensors of the engine 10. The state of each cylinder at a given point in time may depend on the current stroke of the engine cycle for each cylinder.

For the intake stroke, the state may be described in terms of whether the intake value is open, the exhaust is closed, and/or the amount of air and/or fuel entering the cylinder. In some embodiments, the sensor that is positioned at or near the intake valve (LAS1) may generate 50+ measurements (at 3.2K rpm) of fuel composition, energy content (e.g., BTU), etc.

For the compression stroke, the state may be described in terms of whether the intake valve is closed, the exhaust valve is closed, the fuel injector port is open, the homogeneity of the air/fuel mixture, the compression ratio of the cylinder, and/or the manner of ignition. In some embodiments, the sensor that is positioned at or near the cylinder (LAS2) may generate 50+ measurements (at 3.2K rpm) of temp, NOx, CO, UHC, etc.

For the power stroke, the state may be described in terms of whether the intake valve is closed, and/or the exhaust valve is closed. In some embodiments, the sensor that is positioned at or near the cylinder (LAS2) may generate 50+ measurements (at 3.2K rpm) of temp, NOx, CO, UHC, etc.

For the exhaust stroke, the state may be described in terms of whether the intake valve is closed, the exhaust valve is open, and/or whether exhaust gas recirculation (EGR) is being used. In some embodiments, the sensor that is positioned at or near the exhaust valve (LAS3) may generate 50+ measurements (at 3.2K rpm) of temp, NOx, CO, UHC, etc.

In some embodiments, the engine component parameters that may be dynamically managed by the controller 10 may include any, all, or some subset of: intake valve actuation speed, timing, lift, during phasing, and/or frequency; exhaust valve actuation speed, timing, duration, lift, phasing, and/or frequency; air/fuel ratio; spark ignition (SI) fuel injection timing and/or duration; spark ignition timing, intensity, duration, and/or frequency; fuel injection timing, quantity, and/or frequency; and/or compression ratio variable valve timing. The controller 10 may generate actuator command data that is used to set, modify, or implement the engine component parameters. The example engine component parameters described herein are illustrative only, and are not intended to be limiting, required or exhaustive. In some embodiments, the controller 10 may generate actuator command data that is use to set, modify, or implement additional, fewer, and/or alternative engine component parameters.

While the embodiment illustrated in FIG. 1 is directed to a camless engine configuration, it is appreciated that the one or more LAS sensors may also be implemented at various locations within a camshaft engine to provide feedback and control of one or more actuators (e.g., spark ignition, fuel injection variable compression, etc.).

Example AI/ML-Based Camless Engine Optimization System

Figure 2:
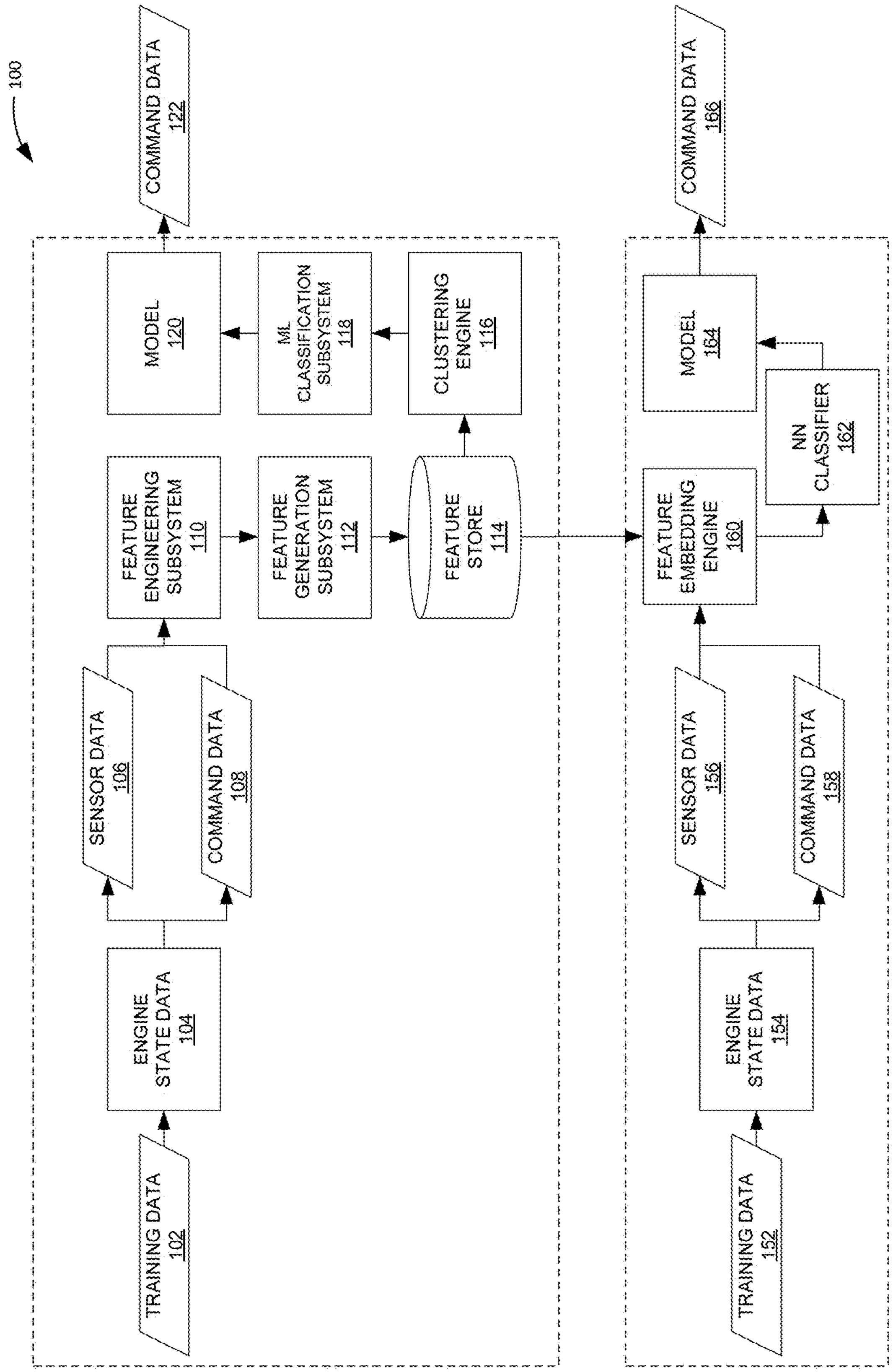
FIG. 2 is a diagram illustrating a training environment in which a machine learning model for use by a camless engine controller may be trained according to some embodiments.

FIG. 2 illustrates an example of an AI/ML-based camless engine optimization system 100, also referred to in the description that follows as an AI/ML system 100 for brevity. In some embodiments, the AI/ML system 100 may be implemented using one or more computing systems such as the computing system 1000 illustrated in FIG. 7 and described in greater detail below.

The AI/ML system 100 may be configured to predict the likelihood that a given camless engine state exhibits patterns of actuator commands that will produce the optimal performance of a camless engine, such as engine 10. In some scenarios, use of AI/ML to implement a controller 12 of a camless engine 10 may provide a significant technical improvement over conventional pre-programmed and rules-based control systems. For example, an AI/ML system 100 may be capable of generating models that, when used by controller, produce actuator commands that provide more efficient engine performance (e.g., fewer false positives, fewer false negatives) than commands provided by conventional controllers. Moreover, the AI/ML system 100 can generate models that are able to target specific optimizations based on up-to-the-millisecond sensor data in a manner that may be difficult, impractical, or impossible achieve in the absence of AI/ML training, rapid sensor data provided by LAS sensors, and dynamic actuation provided by a camless engine.

With reference to an illustrative example, it is expected that stationary and non-stationary engine deployments will produce a wide variety of environmental conditions that will have a direct impact on the performance of the engine 10. Under pre-configured and handcrafted actuator commands, adaptation to various environmental factors was impossible to optimize in real-time and would require significant programming efforts while still suffering from the high rates of false positives and false negatives as discussed above.

In contrast, the AI/ML training mechanism provides a powerful capability for rapidly and effectively adjusting to various engine conditions without a need for significant re-coding of the system. By re-training as new training data becomes available, the inventive system is highly scalable for adapting to previously unseen patterns of the engine state and sensor readings that could be generated by a combination of internal and external factors including but not limited to continued engine workload and environmental conditions.

The AI/ML system 100 may iteratively process training data 102 to compute a trained classification model 120 for use by an execution system, such as a controller 12 of a camless engine 10. The execution system processes engine LAS sensor data to classify actuator commands based on the trained classification model 120 to formulate a classification indicative of the likelihood that the actuator commands represent optimal engine performance.

The upper box in FIG. 2 is used for illustrative purposes to delineate various components and machine learning techniques that in some embodiments may rely on generating valuable handcrafted features through the use of statistical analysis and visualization techniques before using these features in a machine learning classification or regression model. In contrast, the lower box in FIG. 2 is used for illustrative purposes to delineate a neural network classifier 162 that is generally able to derive patterns, correlations, and connections from data without the need for explicit handcrafted features. However, this characterization of the elements of the AI/ML system 100 illustrated in FIG. 2 is not limiting or required. For example, in some embodiments the neural network classifier 162 may use features produced by feature engineering subsystem 110 and feature generation subsystem 112, or otherwise stored in feature store 114.

It should be understood that AI/ML system 100 and the execution system can be deployed on one or more computing machines. Thus, in an example embodiment, a first processor (or set of processors) can execute code to serve as the AI/ML system 100 while a second processor (or set of processors) can execute code to serve as the controller 12. These processors can be deployed in computer systems that communicate with each other via a network, where the AI/ML system 100 communicates a data structure representing the trained classification model 120, 164 over the network to the execution system. Further still, these networked computer systems can be operated by different entities. Thus, the AI/ML system 100 can be operated by a first-party that serves as the "master" or "expert" with respect to the development of a well-tuned classification model, while one or more execution systems operated by different camless engines can access this classification model when testing optimal engine performance derived from actuator commands. However, it should also be understood that in another example embodiment, the same processor (or set of processors) can execute code for both the AI/ML system 100 and the execution system.

In some embodiments, the engine state data 104 and/or engine state data 154 can represent a sequence of engine cycles relating to one or more engines in stationary or non-stationary deployment in a variety of external conditions. In the description that follows, it is assumed that the engine state data 104, 154 comprises data regarding a sequence of engine cycles for a stationary or non-stationary use case in a variety of environmental conditions over its lifetime of active use.

The engine state data 104 and/or engine state data 154 can be derived from a series of engine cycles across various engines deployed where the engine can transmit these readings to a sensor log. The engine state data 104, 154 can also be from a real-time stream of engine cycles generated by the engine during operation in either stationary or non-stationary scenarios.

The engine state data 104 and/or engine state data 154 may include sensor data 106 representing one or more of: fuel composition and energy content data received from one or more sensors positioned at or near the intake; NOx, CO, UHC, CO2 data received from one or more sensors positioned at or near the exhaust; and/or temperature, CO, H2O, UHC, CO2 data received from one or more sensors positioned at or near the cylinder.

Such examples of sequences of sensor data 106 and/or sensor data 156 produced by engine cycles along with actuator command data 108 and/or actuator command data 158 regarding the currently-operative actuator commands can be positively labeled as producing more efficient engine performance and used by the AI/ML system 100 to train the model 120.

In some embodiments, negatively labeled training data 102 may be used to train the model 120, in which case the AI/ML system 100 can employ a supervised learning process in which the model 120 is trained based on positive examples of actuator commands and negative examples of actuator commands.

However, negative examples of actuator commands may not be widely available. As such, in another example embodiment, the AI/ML system 100 can employ a semi-supervised learning process in which the model 120 is trained based on both (1) sequences of sensor data 106 and command data 108 that are positively labeled as producing efficient engine performance, and (2) sequences of sensor data 106 and command data 108 that are unlabeled as to whether or not they produce improved and efficient engine performance.

Furthermore, as new training data 102 becomes available, the AI/ML system 100 can use this new training data 102 to further train the model 120 to improve its discriminatory capabilities.

Thus, it is expected that the model(s) produced by the AI/ML system 100 will improve over time in their ability to appropriately classify sensor data to produce optimal actuator commands which in turn will produce improved camless engine performance.

The AI/ML system 100 may pre-process the training data 102 and 152 to normalize the data to a common format regardless of the source for such data. Different sensors on the engine 10 may produce different formats for sensor data, and pre-processing operations (not shown in FIG. 1) may be used to convert such data to a common format. For example, the temperature value from an LAS sensor in the exhaust may represent degrees centigrade while the temperature value from an LAS sensor in the cylinder may represent degrees Fahrenheit. Similarly, sensors from different manufacturers might represent different formats and units of measurement for the various readings they represent.

So that the AI/ML system 100 can perform "like for like" processing, normalization pre-processing can be employed to ensure that the sensor data 106, 156 and training data 102, 152 exhibit a common format regardless of the source for such data.

In some embodiments, a feature engineering subsystem 110 and/or feature generation subsystem 112 may be employed. Advantageously, these subsystems may combine to populate a feature store 114 that can be used effectively for various supervised and unsupervised machine learning techniques.

The feature engineering subsystem 110 may be used to automatically or interactively (e.g., under control of a data scientist) to perform various statistical techniques to find valuable signals within the data that correlate sensor data to command data. For example, a data scientist, camless engine expert, other practitioner, or some combination thereof may identify preliminary patterns within the data that might be of value. Often this analysis produces additional valuable features beyond the initial engine sensor data.

For example, during analysis, a data scientist might run various correlation coefficients on the engine LAS sensor data and find there is a strong relationship between spark ignition timing and compression ratio with certain time intervals, which would form a new composite feature. This feature, along with the corresponding sensor data would be stored in the feature store 114 for use in downstream classification tasks such as those performed by model 120 and/or model 164 to produce command data 122 and/or command data 166, respectively.

In addition, the feature store 114 can be used multiple times for additional feature engineering and value exploration to continually produce stronger statistical signals. These new features may produce better accuracy in classification by reducing the dimensionality of the data.

In some embodiments, the AI/ML system 100 can perform clustering on training data in the feature store 114 via a clustering engine 116. For example, sensor data can be grouped into clusters based on any number of criteria.

In some embodiments, clustering may be used to segment engine cycles into subgroups of engine state data for evaluation of potential engine performance optimization resulting from the specific actuator commands. By segmenting the engine state data by engine cycles for evaluation, a large data set is divided into analyzable units of work that can be assessed independently for patterns of actuator commands and distributed over multiple processors if desired. These subgroups can be referred to as engine cycle clusters, and they represent a group of engine state data deemed to be contextually and collectively relevant when reviewed together to assess potential engine performance improvements derived from optimal actuator commands.

Clusters may be thought of as "a set of cycles" because each cluster may include a group of engine cycles that collectively demonstrate the ideal combination of actuator commands that produce the best engine performance over a period of time and not necessarily individual engine cycles.

The desired optimization may be ephemeral such as a single-engine cycle or it may involve a more complex strategy such as gradually analyzing engine sensor readings over a period of time while engine performance fluctuates based on changes in the environment, internal engine state, and associated actuator commands.

A variety of clustering techniques can be used to generate these engine cycle clusters, such as k-means clustering, density-based spatial clustering of applications with noise (DBSCAN), and the like.

As noted above, the AI/ML system 100 can employ machine learning to process sets of training data 102 to train a classification model 120 to distinguish between engine performance optimization and engine performance degradation. The training data 102 may take the form of a sequence of sensor data, and any of a plurality of machine learning techniques can be used by the training system to train the classification model 120 from this training data 102.

For example, the AI/ML system 100 could employ supervised, unsupervised, or semi-supervised machine learning. In a supervised or semi-supervised machine learning process, the training data 102 is labeled as to whether such training data 102 is deemed to qualify to improve the engine performance derived from a set of actuator commands.

Training data 102 may come from a variety of environments. For example, an engine can be deployed in a stationary location with a consistent workload where optimal actuator commands produce longevity. Another example might be an engine that is deployed in a consistent in-motion motor vehicle that has very fluctuating workloads across various environmental conditions and actuator commands based on immediate engine performance improvements.

A clustering engine 116 may group the collected sensor data into clusters by time proximity according to an engine cycle interval parameter. In some embodiments, the engine cycle interval parameter may be used to define how many consecutive engine cycles must be to be segmented into different clusters. Thus, where the count between consecutive engine cycles is less than the engine cycle interval, these engine sensor readings are grouped into the same cluster. A new cluster is started whenever two consecutive items of sensor data (e.g., output of sensor data from the same sensor or set of sensors over two consecutive points in time) exceed the engine cycle interval, in which case the most recent of the two consecutive items of sensor data would become the first sensor data item in the new cluster.

The value for the engine cycle interval parameter may be determined according to a desired criterion. In general, a value for the engine cycle interval parameter that is too small may result in the formation of clusters that do not capture sufficient data, which may detract from detection performance. Similarly, a value for the engine cycle interval parameter that is too high may result in the formation of clusters that capture too much data, which may also detract from detection performance.

In an example embodiment, the engine cycle interval parameter may be a static value that is pre-determined based on a statistical analysis of the engine sensor data as well as their linear combination. In another example embodiment, the engine cycle interval parameter may be a dynamic value that varies based on metrics such as several engine cycles and/or an anomaly in the sensor data. For instance, as the number of engine cycles increases, the engine cycle count may be decreased to optimally segment the shorter engine cycle activity. On the other hand, as the engine workload decreases, the engine cycle count may be increased to optimally segment the consistent engine cycle workload. The determination of a value for the engine cycle interval may be performed daily or based on some other interval.

The AI/ML system 100 may utilize the clusters as input for one or many supervised machine learning classification processes performed by a machine learning classification subsystem 118 to produce an accurate classification model 120 that is capable of predicting optimal command data 122 (e.g., actuator commands, changes to actuator commands, or data from which actuator commands may otherwise be derived) for improved engine performance given a set of sensor readings.

In an example embodiment, the clusters are encoded for training input to distributed gradient boosting machine such as XGBoost to train an accurate model 120 for unseen and out-of-distribution sensor data in the future. This model 120 can then be deployed on the controller 12 of the engine 10 to provide real-time instruction for actuator commands that would result in optimal engine performance.

In some cases, due to the volume of engine LAS sensor data, it may prove unfeasible for a practitioner to analyze and accurately identify the ideal sensor data values or engine cycle intervals that would produce the optimal actuator commands. In such cases, the AI/ML system 100 may utilize a multi-layer layer perceptron or feed-forward neural network classifier 162 to produce a classification without the need for explicit feature engineering (such as that described above with respect to the feature engineering subsystem 110).

The neural network classifier 162 may advantageously utilize the feature store 114 in addition to the entire log of sensor data without the explicit need for additional clustering or feature engineering. In an example embodiment, training data 152 is encoded by an embedding layer, such as a feature embedding engine 160. This embedding layer may transform sensor data into value-orientated vectorized representations that contextualize individual sensor data items into engine cycles and the corresponding contribution over time or engine cycles. The embedding layer may form part of a neural network architecture such as a transformer, which is able to effectively model the impact of individual sensor data items across a long sequence of engine cycles. The neural network classifier 162 is then capable of identifying the number of cycles that are indicative of optimal engine performance and discarding the sensor data that is not relevant.

Example Neural-Network-Based Camless Engine Control System

Figure 3:
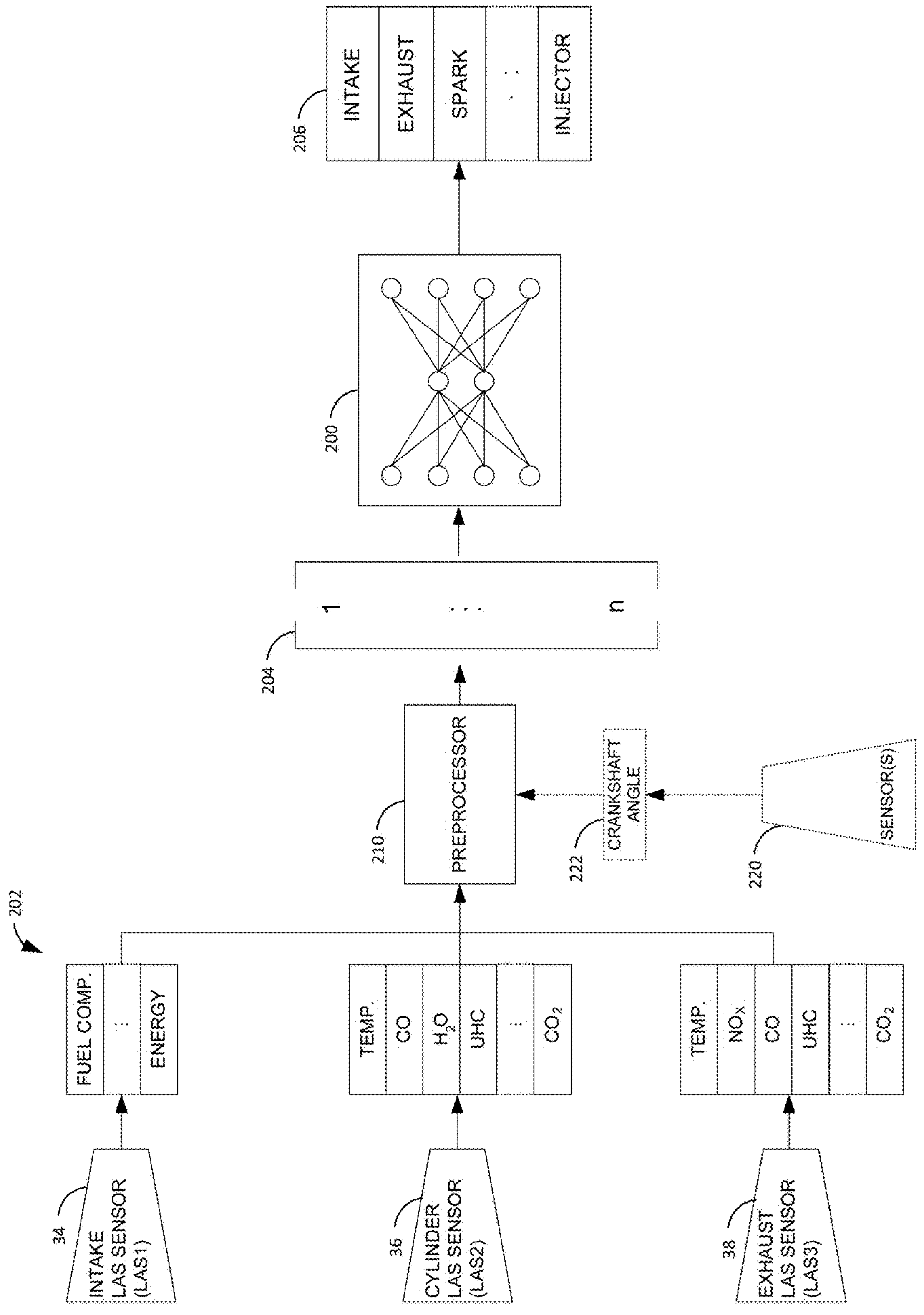
FIG. 3 is a diagram illustrating generation of engine component actuator commands based on evaluation of sensor data regarding engine operation using a machine learning model according to some embodiments.

FIG. 3 is a diagram of an illustrative machine learning model 200 configured to process data from LAS sensors (e.g., LAS1 34, LAS2 36, LAS3 38) and generate actuator commands 206 to optimize one or more aspects of engine function or to otherwise implement one or more features.

In some embodiments, as shown, the model 200 is implemented as a neural network, also referred to herein simply as a neural network (NN) for brevity. Generally described, NNs—including deep neural networks (DNNs), convolutional neural networks (CNNs), recurrent neural networks (RNNs), other NNs, and combinations thereof—have multiple layers of nodes, also referred to as "neurons." Illustratively, a NN may include an input layer, an output layer, and any number of intermediate, internal, or "hidden" layers between the input and output layers. The individual layers may include any number of separate nodes. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. When a NN is used to process input data in the form of an input vector or a matrix of input vectors (e.g., sensor data, such as the values of the individual sensor readings at a point in time sequence of points in time), the NN may perform a "forward pass" to generate an output vector or a matrix of output vectors, respectively. The input vectors may each include n separate data elements or "dimensions," corresponding to the n nodes of the NN input layer (where n is some positive integer, such as the total number sensor data points generated by LAS sensors 34, 36, and 38 at a time t). Each data element may be a value from sensor data 202, such as a floating-point number or integer (e.g., a temperature measurement, a $CO_2$ measurement, etc.). In some embodiments, sensor data 202 may be evaluated by a preprocessor 210 to generate an input vector 204. For example, the preprocessor 210 may extract or otherwise derive features from the sensor data 202 to be processed by the model 200.

A forward pass typically includes multiplying input vectors by a matrix representing the weights associated with connections between the nodes of the input layer and nodes of the next layer, applying a bias term, and applying an activation function to the results. In some embodiments, a non-linearity is applied to activate the neurons, which allows the network parameters to converge to minima. The process is then repeated for each subsequent NN layer. Some NNs have hundreds of thousands or millions of nodes, and millions of weights for connections between the nodes of all of the adjacent layers.

Figure 4:
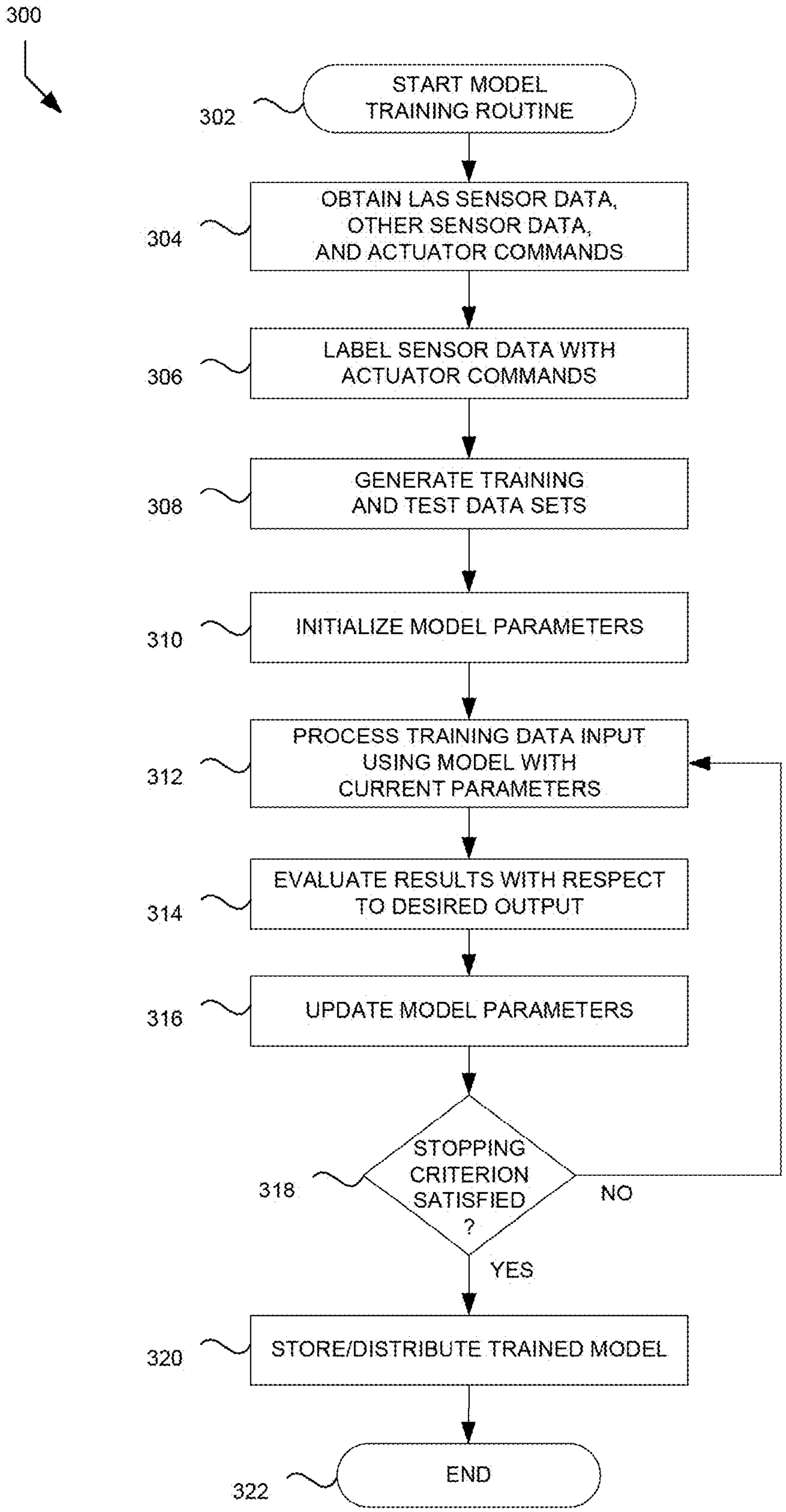
FIG. 4 is a flow diagram of an illustrative process for training a machine learning model using sensor data regarding engine operation according to some embodiments.

FIG. 4 is a flow diagram of an illustrative routine 300 that may be executed to train a machine learning model 200 to generate actuator commands from sensor data 202. The routine 300 begins at block 302. The routine 300 may begin in response to an event, such as when a training system begins operation, or in response to some other event or trigger. When the routine 300 is initiated, a set of executable program instructions stored on one or more non-transitory computer-readable media (e.g., hard drive, flash memory, removable media, etc.) may be loaded into memory (e.g., random access memory or RAM) of a computing system, such as the computing system 1000 shown in FIG. 7 and described in greater detail below. In some embodiments, the routine 300 or portions thereof may be implemented on multiple processors, serially or in parallel.

At block 304, the computing system 1000 may obtain sensor data from which to generate training data. Illustratively, an engine 10 may be operated under one or more sets of conditions. During the course of operation, the LAS sensors 34, 36, and/or 38 may generate sensor data 202 to be used to train the model. In some embodiments, additional sensor data 222 may be obtained from one or more other sources for use in training the model. For example, the engine 10 may include sensors 220 other than the LAS sensors 34, 36, and/or 38, such as other LAS sensors and/or sensors used in conventional engines (e.g., to detect crank shaft angle and/or speed, oxygen, etc.).

In some embodiments, sensor data 202 (and, optionally, sensor data 222) may be preprocessed (e.g., by preprocessor 210) prior to, or as part of the process of, generating training data upon which to train a machine learning model. For example, sensor data 202 may be process to extract features from data points of individual sensors, to combine data from multiple sensors into features, to filter out data from some sensors, to apply transformations to data from some or all sensors, to perform other operations, or any combination thereof. The output of the preprocessing may be a set of input vectors 204 for the model 200.

At block 306, the computing system 1000 may label a portion of the sensor data 202, sensor data 222, and/or data derived therefrom. In some embodiments, the computing system may provide a user interface for engineers or other experts. The user interface may be a graphical user interface delivered as a web page, mobile application interface, desktop application interface, or via some other mechanism of delivery. Users may use the interface to view the sensor data 202, sensor data 222, and/or data derived therefrom (e.g., input vectors 204) and indicate one or more engine actuator commands to be implemented based on the data. The labeled training data items may be stored by the computing system for use in training the model.

At block 308, the computing system 1000 may select training data to be used during the current instance of the routine 300 to train the machine learning model 200. In some embodiments, the computing system may separate the labelled training data inputs into a training set and a testing set. The training set may be used as described in greater detail below to train the machine learning model 200. The testing set may be used to test the trained machine learning model 200. Advantageously, using a separate testing set of labelled inputs to test the performance of the machine learning model 200 can help to determine whether the trained machine learning model 200 can generalize the training to new sensor data that was not presented to the machine learning model during training (or during an iteration of testing).

At block 310, the computing system 1000 can initialize the parameters of the machine learning model 200 to be trained. In some embodiments, the machine learning model may be implemented as a NN. The trainable parameters of the NN include the weights (and in some embodiments the bias terms) for each layer that are applied during a forward pass. In some embodiments, to initialize the parameters of the machine learning model, the computing system can use a pseudo-random number generator to assign pseudo-random values to the parameters. In some embodiments, the parameters may be initialized using other methods. For example, a machine learning model 200 that was previously trained using the routine 300 or some other process may serve as the starting point for the current iteration of the routine 300.

At block 312, the computing system 1000 can analyze training data inputs using the model 200 to produce training data output. Illustratively, the training data output may correspond to a vector of actuator commands, adjustments to actuator commands, or data form which actuator commands or adjustments thereto may be derived. For simplicity, the output will be referred to herein as actuator commands 206. In subsequent blocks of the routine 300, the training data output is used to evaluate the performance of the model 200 and apply updates to the trainable parameters.

At block 314 the computing system 1000 can evaluate the results of processing one or more training data inputs using the model 200. The training data from which the training inputs are drawn may also include reference data output vectors. Each reference data output vector may correspond to a vector of actuator commands, adjustments to actuator commands, or data form which actuator commands or adjustments thereto may be derived. For example, a reference data output vector may include data representing an adjustment to operation of the intake value, exhaust value, spark plug, fuel injector, other engine components, or some combination thereof. The goal of training may be to minimize the difference between the actuator commands 206 output by the model 200 and corresponding reference data output vectors.

In some embodiments, the computing system 1000 may evaluate the results using an objective function associated with a particular desired optimization of an engine attribute, operation, or function. The objective function may also be referred to as a loss function. In some embodiments, the loss function may be a binary cross entropy loss function, a weighted cross entropy loss function, a squared error loss function, a softmax loss function, some other loss function, or a composite of loss functions. The loss function can evaluate the degree to which training data output vectors generated using the model 200 differ from the desired output (e.g., reference data output vectors) for corresponding training data inputs.

At block 316, the computing system 1000 can update parameters of the model 200 based on evaluation of the results of processing one or more training using the model 200. The parameters may be updated so that if the same training data inputs are processed again, the output produced by the model 200 will be closer to the desired output represented by the reference data output vectors that correspond to the training data inputs. In some embodiments, the computing system 1000 may compute a gradient based on differences between the training data output vectors and the reference data output vectors. For example, gradient (e.g., a derivative) of the loss function can be computed. The gradient can be used to determine the direction in which individual parameters of the model 200 are to be adjusted in order to improve the model output (e.g., to produce output that is closer to the correct or desired output for a given input). The degree to which individual parameters are adjusted may be predetermined or dynamically determined (e.g., based on the gradient and/or a hyper parameter). For example, a hyper parameter such as a learning rate may specify or be used to determine the magnitude of the adjustment to be applied to individual parameters of the model 200.

In some embodiments, the computing system 1000 can compute the gradient for a subset of the training data, rather than the entire set of training data. Therefore, the gradient may be referred to as a "partial gradient" because it is not based on the entire corpus of training data. Instead, it is based on the differences between the training data output vectors and the reference data output vectors when processing only a particular subset of the training data.

With reference to an illustrative embodiment, the computing system 1000 can update some or all parameters of the machine learning model 200 (e.g., the weights of the model) using a gradient descent method with back propagation. In back propagation, a training error is determined using a loss function (e.g., as described above). The training error may be used to update the individual parameters of the model 200 in order to reduce the training error. For example, a gradient may be computed for the loss function to determine how the weights in the weight matrices are to be adjusted to reduce the error. The adjustments may be propagated back through the model 200 layer-by-layer.

At decision block 318, the computing system 1000 can in some embodiments determine whether one or more stopping criteria are met. For example, a stopping criterion can be based on the accuracy of the machine learning model 200 as determined using the loss function, the test set, or both. As another example, a stopping criterion can be based on the number of iterations (e.g., "epochs") of training that have been performed, the elapsed training time, or the like. If the one or more stopping criteria are met, the routine 300 can proceed to block 320; otherwise, the routine 300 can return to block 312 or some other prior block of the routine 300.

At block 320, the computing system 1000 can store and/or distribute the trained model 200. The trained model 200 can be distributed to one or more engines 10 for use in managing and optimizing operation. The routine 300 may terminate at block 322.

Example Reinforcement Learning for Camless Engine Control System

Figure 5:
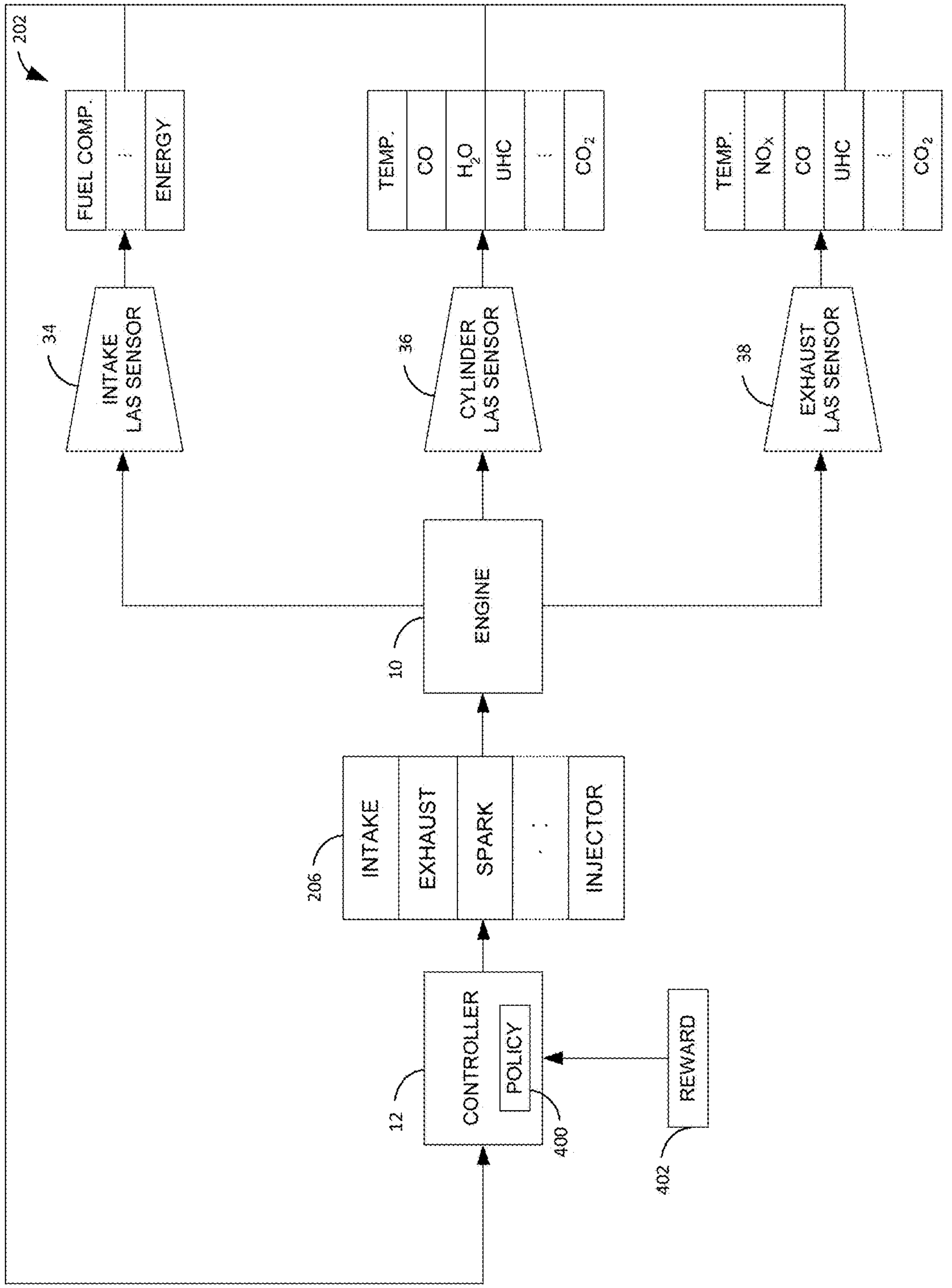
FIG. 5 is a diagram of reinforcement learning to generate engine component actuator commands based on evaluation of sensor data regarding engine operation according to some embodiments.

FIG. 5 is a diagram of an illustrative controller 12 learning a policy 400 through reinforcement learning. Generally described, reinforcement learning differs from supervised learning because labelled training data is not needed. Instead, the focus of reinforcement learning is to explore, from time to time, the effect of different actions given a particular current state even when a current "best available" action for the current state is known. The exploration can help to discover potentially optimal actions for the current state. Thus, reinforcement learning may be used to learn an optimal or substantially optimal policy to select actions given particular states. The optimal policy is learned by maximizing the "reward" that is accumulated by taking various actions, where each action in each state (or some subset thereof) is associated with a particular reward value.

In some embodiments, as shown, the controller 12 is configured to implement a policy 400. The controller 12 may generate actuator commands 206—or data from which actuator commands 206 may be derived—based on application of the policy 400 to the current state of the engine. After each action of the controller 12 (e.g., generation of actuator commands 206) or subsets thereof, the controller 12 may determine or be provided with a reward value 402. Over the course of a reinforcement learning process, the controller 12 may update the policy 400 such that the policy 400 converges on an optimal policy based on the reward values 402 that the controller 12 receives or determines to apply.

In some embodiments, the reward may formally be defined in terms of the optimal policy, notated as $\pi^*=\text{argmax}\ E(R|\pi)$, where $E(R|\pi)$ is the expected sum E of rewards R from a given policy $\pi$. A policy may be a map or function, and a set of possible policies may be available. Thus, the optimal policy $\pi^*$ is an argmax (which selects the maximum) over the set of possible policies as a function of their expected rewards. In some embodiments, a value function such as a Q-Function may be used to determine the reward value for taking an action in a given engine state. For example, $Q\pi: (s|a)\rightarrow E(R|a,s,\pi)$: $Q\pi$ is a function that maps the pair (s,a) of a state s and an action a to the expected reward of taking action a in state s, given use of policy $\pi$. A goal of reinforcement learning is to train a model that produces accurate estimates of the expected reward for taking an action given a state.

Figure 6:
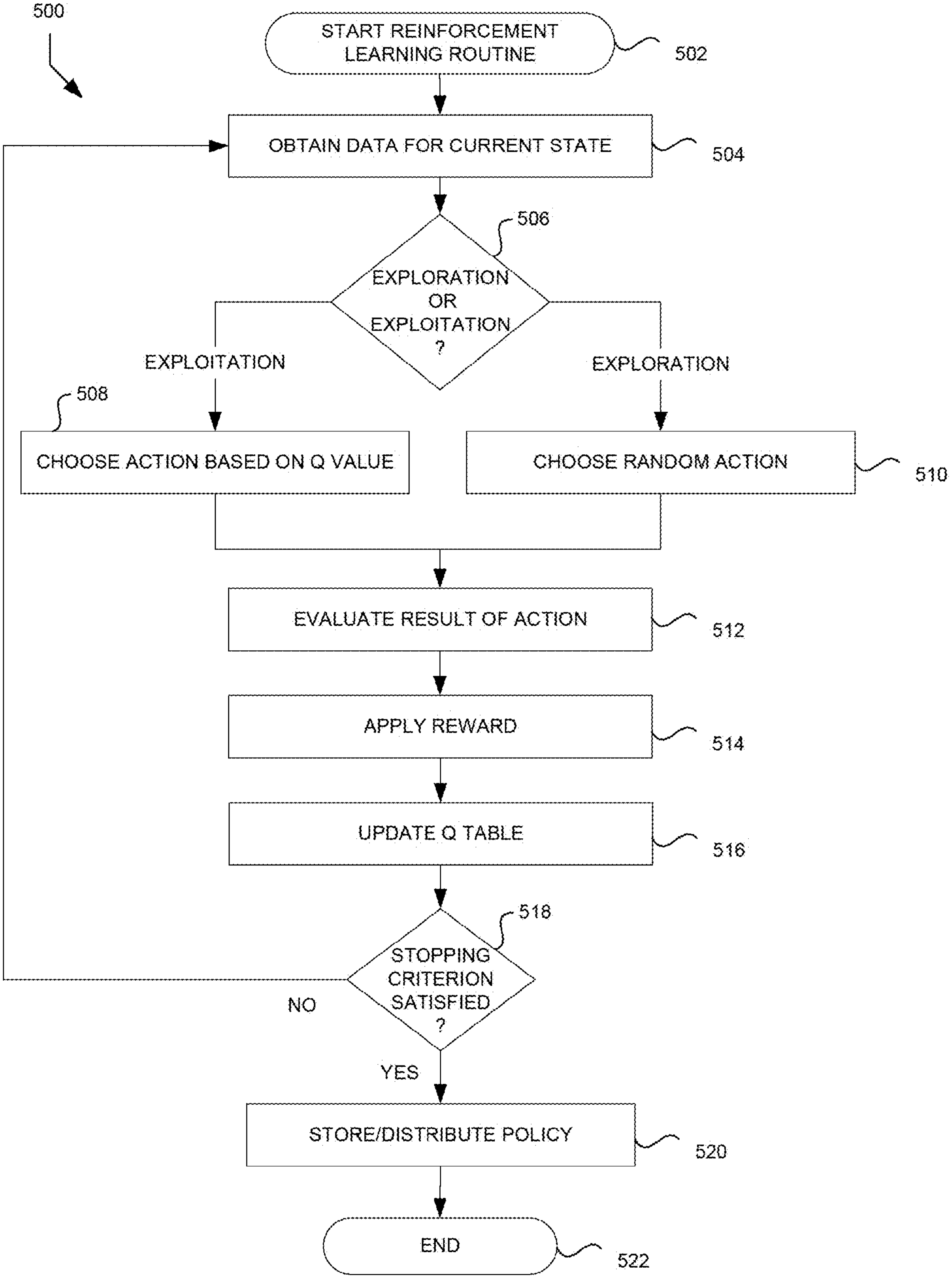
FIG. 6 is a flow diagram of an illustrative process for reinforcement learning using sensor data regarding engine operation according to some embodiments.

FIG. 6 is a flow diagram of an illustrative routine 500 for implementing reinforcement learning. The routine 500 begins at block 502. The routine 500 may begin in response to an event, such as when a controller 12 begins operation, is instructed to perform reinforcement learning, or in response to some other event or trigger.

At block 504, the controller 12 may obtain data for the current state of the engine 12. In some embodiments, the current engine state may be represented by a most-recently-generated set of LAS sensor data 202, other sensor data, the current set of actuator commands, other data, or some combination thereof.

At decision block 506, the controller 12 may determine whether the action to be chosen for the current state is to be chosen by exploration or exploitation. In exploitation, the best available action is selected for the current engine state based on the current policy 400. In exploration, an action may be selected using a random or pseudo-random selection method, such as by using a pseudo-random number generator (PRNG). By randomly or pseudo-randomly selecting an action, an action that is potentially better in terms of desired optimization that the current best available action may be discovered. In some embodiments, the exploration/exploitation decision may be based on a predetermined or dynamically-determined percentage of exploration and exploitation actions. For example, the controller 12 may be configured to randomly or pseudo-randomly choose exploration a particular percentage (e.g., 10%) of the time. If the controller 12 chooses exploitation, the routine 500 may proceed to block 508. Otherwise, if the controller 12 chooses exploration, the routine 500 may proceed to block 510.

At block 508, for exploitation, the controller 12 may choose the current best-available action for the current engine state. In some embodiments, the policy may 400 may indicate the current best-available action for each engine state, or a subset thereof. For example, if the routine 500 is a Q-learning-based reinforcement routine, the policy 400 may include a table that assigns a "Q value" to teach engine state and available action. Higher Q values may represent more desirable actions than lower Q values (e.g., where the desirability relates to the expected subsequent engine state if a particular action is taken from the current engine state). Thus, the controller 12 may determine the action with the highest Q value for the current engine state.

At block 510, for exploration, the controller 12 may choose an action using a random or pseudo-random selection method, such as by using a PRNG to select from all available actions given the current engine state.

At block 512, the controller can evaluate the result of the chosen action. In some embodiments, evaluation of the result of the chosen action is based on feedback data, such as engine state data representing the state of the engine 10 subsequent to performing the chosen action.

At block 514, the controller can apply a reward value 402 based results of applying the selected action. In some embodiments, a reward value 402 may be generated if the temperature determined by a particular LAS sensor remains within a particular range (1,800° K to 2,200° K) for a particular quantity of measurements or period of time (e.g., over the course of a stroke, cycle, or set of cycles). In some embodiments, a reward value 402 may be generated if a fluid parameter (e.g., measurement of NOx and/or CO) remains below a threshold for a particular quantity of measurements or period of time (e.g., over the course of a stroke, cycle, or set of cycles). In some embodiments, a reward value 402 may be generated based on achieving and/or maintaining a degree of performance (e.g., electrical efficiency with NOx, CO emissions below set thresholds).

In some embodiments, the reward value 402 is determined using an action-value function. The reward value 402 for any given iteration of block 514 may be either positive or negative. A goal of the reinforcement learning routine is to maximize the total reward values 402 over time. Controller 12 receives a particular reward value 402 based on taking action a(t) in engine state s(t), leading to a new engine state s(t+1). Illustratively, a(t) may be initiation of an actuator command based on actuator command data generated by the controller 12 at time t, engine state s(t) may be represented by the latest LAS sensor data 202 generated at or before time t, and engine state s(t+1) may be represented by the latest LAS sensor data 202 generated at or before time t+1. The reward value 402 may be based on the state transition from s(t) to s(t+1) and the desired optimization of the reinforcement learning routine. For example, the reward value 402 may be based on an observed reduction in emissions from s(t) to s(t+1), maintenance of temperature from s(t) to s(t+1), increase in energy output from s(t) to s(t+1), or the like.

With reference to an illustrative non-limiting example, the desired optimization or goal may be the maintenance of temperature measured at the cylinder within a range of 1,800° K to 2,200° K. LAS sensor 36 (LAS2) may generate LAS sensor data at time t representing a measured temperature of 2,400° K. After performance of action a(t), LAS sensor 36 may generate LAS sensor data at time t+1 representing a measured temperature of 2,300° K. In this case, reward value 402 may be a positive number to reward movement toward the desired range. In contrast, if LAS sensor data at time t+1 represented a measured temperature of 2,500° K, the reward value 402 may be a negative value to penalize movement away from the desired range.

In some embodiments, the reward value 402 may be used in a calculation to determine an updated Q value for the chosen action and prior engine state. For example, the Q value may be updated by computing an intermediate value using the reward value, an estimate of the optimal future value (e.g., based on expected rewards from application of optimal actions to future engine states), and a discount factor. Illustratively, the discount factor may be between 0.0 and 1.0 (inclusive) and may be used to weight reward values received earlier in a sequence of future actions greater than reward values received later in the sequence. A learning rate may be applied to the intermediate value, and the resulting product may be added to the existing Q value for the engine state and selected action to arrive at the updated Q value. Illustratively, the learning rate may be between 0.0 and 1.0 (inclusive) and may be used to control the degree to which Q values can change from update to update.

At block 516, the controller 12 may update a Q table with the revised Q value for the selected action. The updated Q value may then be available for use in subsequent exploitation determinations.

At decision block 518, the controller 12 can in some embodiments determine whether one or more stopping criteria are met. For example, a stopping criterion can be based on the number of actions performed, rewards received, time elapsed, or the like. As another example, a stopping criterion can be based on a degree to which Q values are updated (e.g., updates fall below a threshold magnitude). If the one or more stopping criteria are met, the routine 500 can proceed to block 520; otherwise, the routine 500 can return to block 504 or some other prior block of the routine 500.

At block 520, the controller 12 can store and/or distribute the learned policy 400. The policy 400 can be distributed to one or more engines 10 for use in managing and optimizing operation. The routine 500 may terminate at block 522.

Example Computing System

Figure 7:
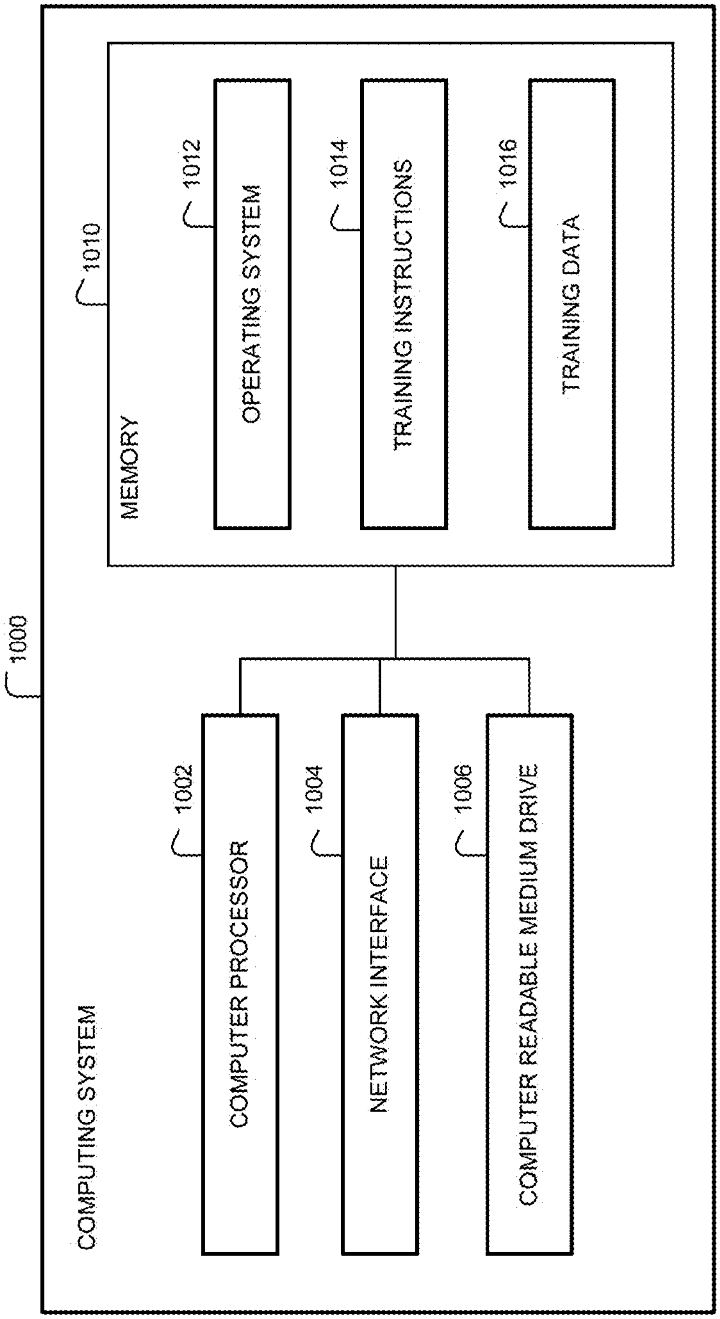
FIG. 7 is a block diagram of an illustrative computing system configured to implement aspects of the present disclosure according to some embodiments.

FIG. 7 illustrates an example computing system 1000 that may be used in some embodiments to execute the routines and implement the features described above. In some embodiments, the computing system 1000 may include: one or more computer processors 1002, such as physical central processing units (CPUs) or graphics processing units (GPUs); one or more network interfaces 1004, such as a network interface cards (NICs); one or more computer readable medium drives 1006, such as high density disks (HDDs), solid state drives (SSDs), flash drives, and/or other persistent non-transitory computer-readable media; and one or more computer-readable memories 1010, such as random access memory (RAM) and/or other volatile non-transitory computer-readable media. The network interface 1004 can provide connectivity to one or more networks or computing devices. The computer processor 1002 can receive information and instructions from other computing devices or services via the network interface 1004. The network interface 1004 can also store data directly to the computer-readable memory 1010. The computer processor 1002 can communicate to and from the computer-readable memory 1010, execute instructions and process data in the computer-readable memory 1010, etc.

The computer-readable memory 1010 may include computer program instructions that the computer processor 1002 executes in order to implement one or more embodiments. The computer-readable memory 1010 can store an operating system 1012 that provides computer program instructions for use by the computer processor 1002 in the general administration and operation of the computing system 1000. The computer-readable memory 1010 can also include machine learning model training instructions 1014 and training data 1016 for implementing training of machine learning models.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A camless reciprocating engine comprising:

a cylinder housing a reciprocating piston;

an engine component associated with the cylinder, wherein the engine component is selected from a group consisting of: an intake valve, an exhaust valve, a spark plug, a fuel injector, and a variable compression mechanism;

an actuator coupled to the engine component, wherein the actuator is configured to control operation of the engine component;

an optical sensor configured to generate sensor data regarding an attribute of cylinder operation; and a controller coupled to the optical sensor and actuator, wherein the controller is configured to:

receive the sensor data from the optical sensor during a particular cycle of the cylinder;

process the sensor data using a neural network trained to generate actuator command data associated with a desired optimization of engine operation; and initiate actuation of the actuator based at least partly on the actuator command data during the particular cycle of the cylinder in which the sensor data was received.

2. The camless reciprocating engine of claim 1, wherein the particular cycle of the cylinder is a four-stroke cycle, wherein the sensor data is generated during a particular stroke of a particular four-stroke cycle of the cylinder, and wherein initiation of the actuator occurs during the particular stroke of the particular four-stroke cycle of the cylinder.

3. The camless reciprocating engine of claim 1, where the optical sensor is a laser absorption spectroscopy sensor.

4. The camless reciprocating engine of claim 3, wherein the sensor data comprises laser absorption spectroscopy data, and wherein the attribute represented by the sensor data is selected from a group consisting of: fuel composition, energy content, temperature, NOx content, UHC content, CO content, $CO_2$ content, and $H_2O$ content.

5. The camless reciprocating engine of claim 1, further comprising a plurality of optical sensors including the optical sensor, wherein the plurality of optical sensors comprises:

a first optical sensor positioned at a location within an intake of the cylinder to measure one or more fluid parameters within the intake;

a second optical sensor positioned to measure one or more fluid parameters at a location within the cylinder; and a third optical sensor positioned at a location within an exhaust of the cylinder to measure one or more fluid parameters within the exhaust.

6. The camless reciprocating engine of claim 1, further comprising a network interface configured to transmit the sensor data to a computing system via a network.

7. The camless reciprocating engine of claim 6, wherein the network interface is further configured to receive a second neural network from the computing system via the network, and wherein the controller is further configured to replace, in memory of the controller, the neural network with the second neural network.

8. The camless reciprocating engine of claim 1, wherein to process the sensor data using the neural network, the controller is configured to:

apply a transformation to the sensor data to generate transformed sensor data, wherein the transformed sensor data represents a feature of a state of the camless reciprocating engine at a point in time;

generate an input vector using the transformed sensor data; and perform a forward pass on the input vector using the neural network to generate an output vector, wherein the output vector comprises the actuator command data.

9. The camless reciprocating engine of claim 1, wherein the controller is further configured to:

determine a change to a parameter of the engine component based on the actuator command data;

wherein the change to the parameter is selected from a group consisting of: timing, phase, and duration of operation, and wherein initiating actuation of the actuator is based on the parameter of the engine component.

10. The camless reciprocating engine of claim 1, wherein the controller is further configured to:

receive second sensor data from the optical sensor, wherein the second sensor data is generated by the optical sensor subsequent to the controller initiating actuation of the actuator based at least partly on the actuator command data;

determine a reward value based on the second sensor data; and modify a parameter of the neural network based on the reward value.

11. A non-transitory machine-readable storage medium storing instructions executable by one or more processors of a computing device, wherein the instructions, when executed by the one or more processors, cause the computing device to:

obtain training data comprising a plurality of training data input vectors and a plurality of reference data output vectors, wherein a training data input vector of the plurality of training data input vectors represents sensor data regarding an attribute of operation of a camless engine, and wherein a reference data output vector of the plurality of reference data output vectors represents actuator command data to be generated by a machine learning model from the training data input vector;

cluster the training data into a plurality of clusters based on time proximity of cycles with which the plurality of training data input vectors are associated, wherein training data input vectors in a first cluster of the plurality of clusters are associated with a first set of cycles observed during a first period of time, and wherein training data input vectors in a second cluster of the plurality of clusters are associated with a second set of cycles observed during a second period of time subsequent to the first period of time;

train the machine learning model using the training data and an objective function, wherein the objective function is associated with optimization of an engine function; and provide the machine learning model that has been trained to one or more camless engines.

12. The non-transitory machine-readable storage medium of claim 11, wherein the optimization of the engine function is selected from a group consisting of:

minimizing a measurement of an emission, maximizing a measurement of an output, and maintaining a measurement of temperature.

13. The non-transitory machine-readable storage medium of claim 11, wherein the sensor data comprises laser absorption spectroscopy sensor data, and wherein the attribute represented by the sensor data is selected from a group consisting of: fuel composition, energy content, temperature, NOx content, UHC content, CO content, $CO_2$ content, and $H_2O$ content.

14. The non-transitory machine-readable storage medium of claim 11, wherein the machine learning model comprises a neural network.

15. The non-transitory machine-readable storage medium of claim 11, wherein to cluster the training data, the instructions cause the computing device to cluster the plurality of training data input vectors by time proximity according to an engine cycle interval parameter.

16. A computer-implemented method comprising:

as performed by a control system for a camless engine, the control system comprising one or more computer processors configured to execute specific instructions, receiving sensor data from an optical sensor in optical communication with an engine component associated with a cylinder of the camless engine, wherein the engine component is selected from a group consisting of: an intake valve, an exhaust valve, a spark plug, a fuel injector, and a variable compression mechanism;

processing the sensor data using a neural network trained to generate actuator command data associated with a desired optimization of engine operation;

initiating actuation of an actuator of the camless engine based at least partly on the actuator command data;

receiving second sensor data from the optical sensor, wherein the second sensor data is generated by the optical sensor subsequent to the initiating actuation of the actuator based at least partly on the actuator command data;

determining a reward value based on the second sensor data; and modifying a parameter of the neural network based on the reward value.

17. The computer-implemented method of claim 16, further comprising:

determining a change to a parameter of the engine component based on the actuator command data;

wherein the change to the parameter is selected from a group consisting of: timing, phase, and duration of operation, and wherein initiating actuation of the actuator is based on the parameter of the engine component.

18. The computer-implemented method of claim 16, further comprising:

applying a transformation to the sensor data to generate transformed sensor data, wherein the transformed sensor data represents a feature of a state of the camless engine at a point in time;

generating an input vector using the transformed sensor data; and performing a forward pass on the input vector using the neural network to generate an output vector, wherein the output vector comprises the actuator command data.

19. The computer-implemented method of claim 16, wherein the optical sensor is a laser absorption spectroscopy sensor.

20. The computer-implemented method of claim 19, wherein the sensor data comprises laser absorption spectroscopy data, and wherein an attribute represented by the sensor data is selected from a group consisting of: fuel composition, energy content, temperature, NOx content, UHC content, CO content, $CO_2$ content, and $H_2O$ content.

* * * * *